Jan. 9, 1923.  1,441,865.
C. G. McKINNEY.
SLIDABLE KEYHOLE GUARD CONNECTED WITH CIRCUIT BREAKING DEVICES.
FILED MAR. 21, 1922. 2 SHEETS—SHEET 1.
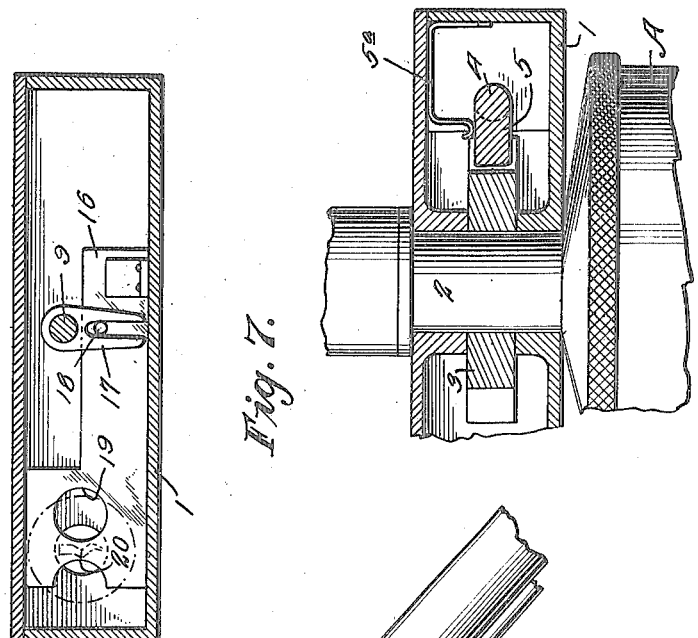
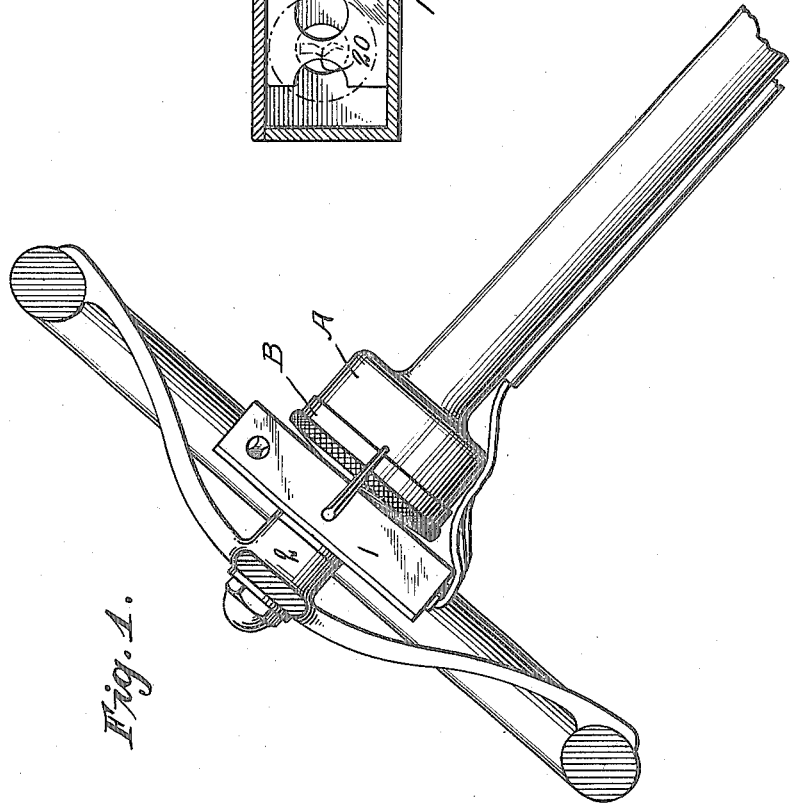
Inventor
Claude G. McKinney
By Wm. B. Jaynes
Attorney

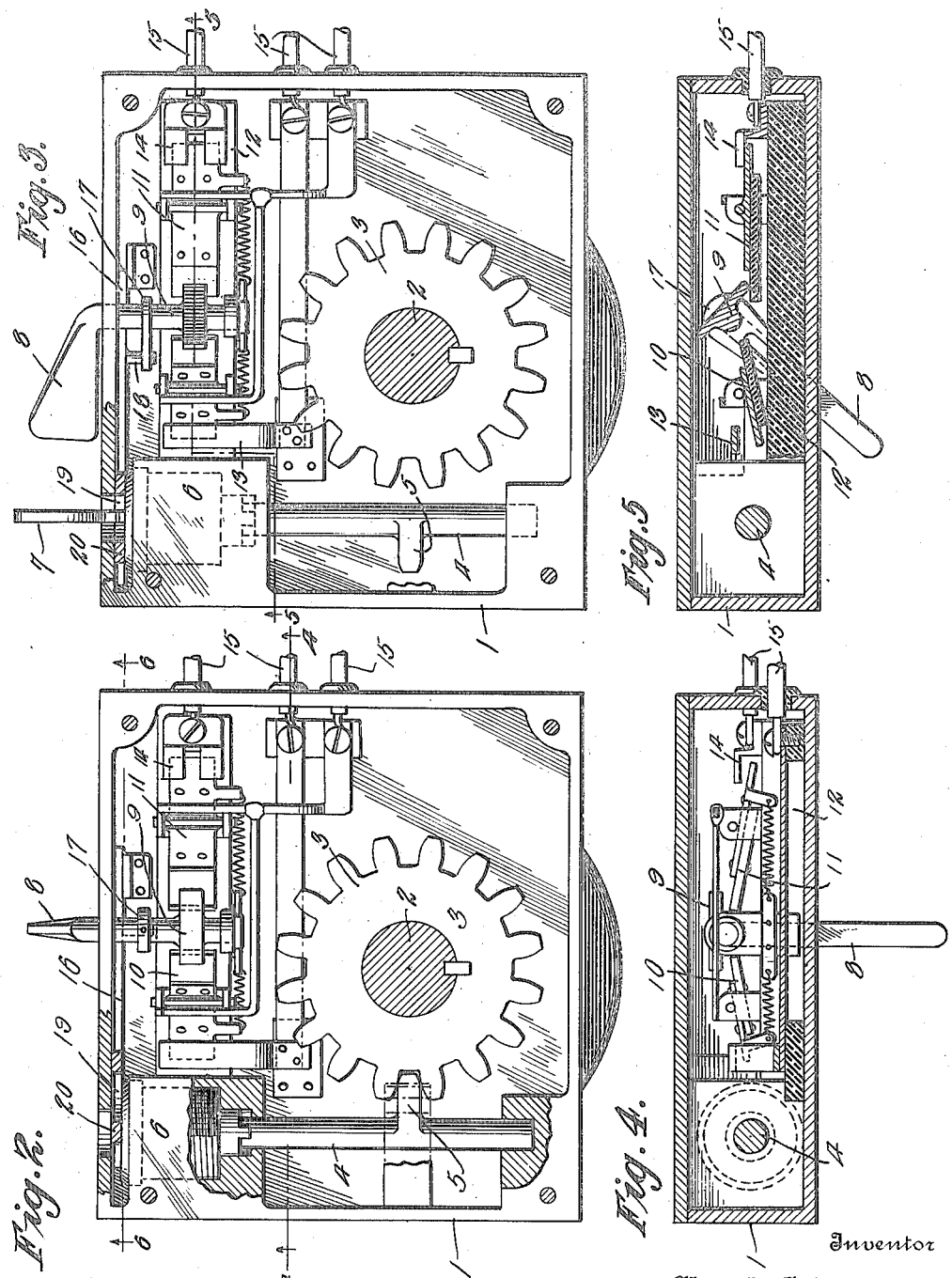

Patented Jan. 9, 1923.

1,441,865

UNITED STATES PATENT OFFICE.

CLAUDE G. McKINNEY, OF HENRIETTA, TEXAS.

SLIDABLE KEYHOLE GUARD CONNECTED WITH CIRCUIT-BREAKING DEVICES.

Application filed March 21, 1922. Serial No. 545,432.

*To all whom it may concern:*

Be it known that I, CLAUDE G. McKINNEY, a citizen of the United States, residing at Henrietta, in the county of Clay and State of Texas, have invented certain new and useful Improvements in Slidable Keyhole Guards Connected with Circuit-Breaking Devices, of which the following is a specification.

This invention relates to a slidable keyhole guard connected with a circuit breaking device and designed to be used in connection with an automobile steering wheel locking mechanism which of itself forms the subject matter of a separate application.

The object of the invention is to provide a key guard which will prevent a key being inserted in the lock while the engine is cut off, and which will also prevent the switch lever being thrown unless the steering wheel shaft is first locked, making it necessary to lock said shaft, and remove the key before cutting off the engine.

In the accompanying drawings:—

Figure 1 is a side elevation of the device showing its location on the steering wheel post.

Figure 2 is a plan view, partly in section, of my locking and circuit breaking devices, the steering shaft being locked and the switch lever being in off or neutral position.

Figure 3 is a similar view, the parts being in "running position."

Figure 4 is a section on the line 4—4 of Fig. 2.

Figure 5 is a section on the line 5—5 of Fig. 3.

Figure 6 is a section through the lock casing showing the guard plate in side elevation.

Figure 7 is a detail section through the steering shaft locking mechanism.

In the drawings A is the internal gear casing mounted on the steering post and having the usual cap B. My lock casing 1 is mounted on this cap. Portions of the steering wheel shaft are indicated at 2.

A gear wheel 3 is keyed to the shaft 2 within the casing 1. A shaft 4 carries a locking lug or tooth 5 adapted to engage this wheel, the shaft being rotated by a lock 6 and key 7, of the pin type. A spring 5ª holds the tooth 5 in either locking or unlocking position.

The parts above referred to are all shown and described in my co-pending application.

A switch lever 8 controls the ignition circuit, either from battery or magneto, depending on the position of the lever. It has a stem 9 and plate 10 adapted to engage either rocking contact plates 11 or 12, said plates making contact at points 13 and 14, the circuit closed, battery or magneto depending on the side to which the lever 8 is thrown. Midway its swinging movement both circuits are open. To lock this lever and prevent the motor being cut out without locking the steering shaft I provide a keyhole guard in the form of a slide 16. A link 17 on the stem 9 is pivoted to a pin 18 on the slide or plate 16. This plate works against a wall of the casing, and between said wall and the entrance to the lock 6, working transversely across the keyhole. Its end portion is slotted as at 19 and a transverse web 20 extends across the slot. The circuit wires are indicated at 15. It will be understood that the circuits do not form any part of the present invention and are referred to only to make the operation of the device clear.

This operation is as follows:

When the parts are in "running" position the lever 8 is moved to position to close one of the circuits, as in Figure 3, the steering wheel is unlocked, the key 7 is in the position indicated, in which position it cannot be removed from this type of lock, and the web 20 is to one side of the keyhole.

The key prevents sliding movement of the plate 16 and the bifurcated link 17 prevents any movement of the lever 8 unaccompanied by movement of the plate 16, so that as long as the key 7 is in the lock the engine cannot be cut off. To remove the key it is necessary to give it a one-half rotation, thereby locking the steering wheel shaft by throwing the tooth 5 into engagement with the gear 3. The key can then be removed and the lever 8 swung to neutral position cutting off the motor. This movement brings the web 20 across the keyhole, so that the steering wheel cannot be again unlocked without first starting the engine.

Should therefore any attempt be made to pick the lock the work on it must be done after and during the running of the engine, which would necessarily attract the attention of the owner if near by. This device also prevents the operator of a machine parking the same with motor cut out, as required by law in most places, without first locking his steering wheel.

What I claim is:—

1. In a device of the kind described, the combination with a steering shaft locking device including a lock and a key, an ignition switch lever, and a slidable slotted plate in which the key is adapted to work and which is loosely connected to said lever, locking said lever against movement while the key is in the lock.

2. In a steering shaft locking device comprising a lock having a keyhole and a key therefor, a slotted plate having a transverse web working across said keyhole, a switch lever, and means connecting the lever and plate for moving the latter across the keyhole, movement of both plate and lever being prevented by said key while the latter is in the keyway.

3. In a device of the kind described, a switch lever having a neutral position, contact plates closed by movement of the lever to either side of said neutral position, a locking device for a steering wheel comprising a lock barrel and key, a slotted, slidable plate working over the entrance to said barrel and closing the same when the lever is in neutral position, and means connecting said lever and plate, whereby movement of the lever to neutral position is prevented as long as said key is in position in the lock barrel, as and for the purpose set forth.

In testimony whereof I affix my signature.

CLAUDE G. McKINNEY.